United States Patent [19]

Lange

[11] Patent Number: 5,055,695

[45] Date of Patent: Oct. 8, 1991

[54] ALIGNMENT SYSTEM AND METHOD FOR INFRARED INTERFEROMETER

[75] Inventor: Steven R. Lange, Tucson, Ariz.

[73] Assignee: Wyko Corporation, Tucson, Ariz.

[21] Appl. No.: 545,404

[22] Filed: Jun. 28, 1990

[51] Int. Cl.$^5$ .............................................. G01B 9/02
[52] U.S. Cl. .............................. 250/459.1; 250/461.1; 250/372; 356/153; 356/363
[58] Field of Search .................. 250/459.1, 461.1, 372, 250/491.1; 356/363, 153

[56] References Cited

U.S. PATENT DOCUMENTS

| | | | |
|---|---|---|---|
| 4,201,473 | 5/1980 | Domenicali et al. | 356/360 |
| 4,348,838 | 9/1982 | Daniel | 356/153 |
| 4,466,739 | 8/1984 | Kasner et al. | 356/153 |
| 4,530,602 | 7/1985 | Pomphrey, Jr. | 356/153 |

Primary Examiner—Carolyn E. Fields
Assistant Examiner—Drew A. Dunn
Attorney, Agent, or Firm—Cahill, Sutton & Thomas

[57] ABSTRACT

A system for aligning a test beam of an infrared interferometer with a reference beam thereof includes a phosphor screen positioned in a common path of the interferometer at a focal point of a lens in the path. The phosphor screen is illuminated with ultraviolet light to stimulate an area of the phosphor screen to emit visible light. Infrared laser light from the test beam is focused onto a spot of the phosphor screen. The infrared laser light acts on the spot to prevent the phosphor screen from emitting visible light from the spot and hence the position where the laser beam strikes the phosphor screen appears dark. Visible light emitted by the phosphor screen is focused into a visible light camera, and an image of visible light emitted by the phosphor screen is produced on a video monitor. The dark spot on the phosphor screen appears as an image spot on the video monitor. The test beam is adjusted to move the image spot to a predetermined location of the video monitor representing an aligned condition. In the described embodiment, infrared light in the reference arm of the interferometer is blocked to prevent it from being focused onto the phosphor screen. After alignment of the test beam, the phosphor screen is removed from the path to allow an interference beam produced by interference between the reference beam and the test beam to be imaged into an infrared camera.

10 Claims, 1 Drawing Sheet

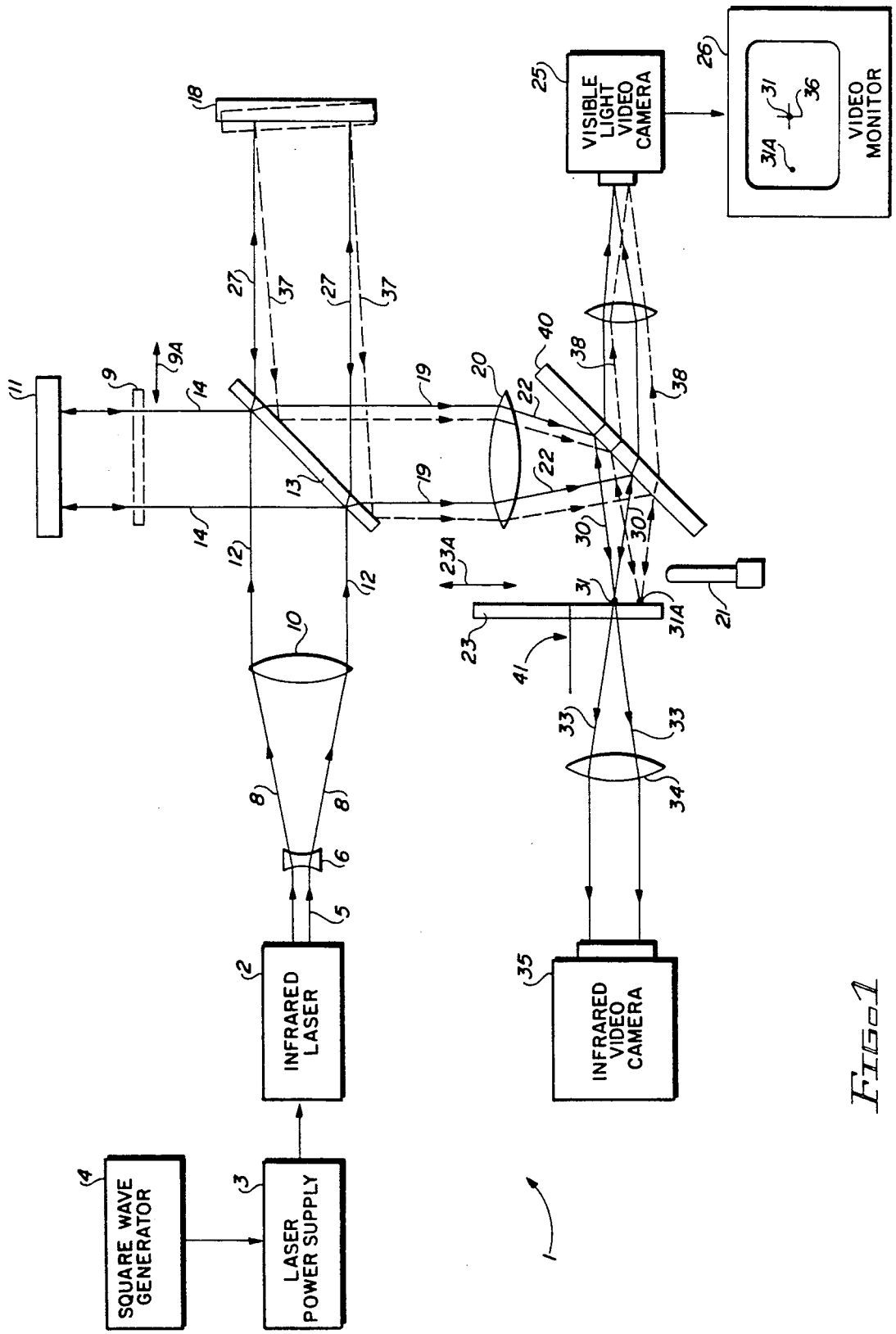

ALIGNMENT SYSTEM AND METHOD FOR INFRARED INTERFEROMETER

BACKGROUND OF THE INVENTION

The invention relates to an apparatus and technique for aligning a test surface or test beam in an infrared interferometer to an optical axis of the interferometer.

U.S. Pat. No. 4,201,473 (Domenicali et al.) issued May 6, 1980 describes an interferometer in which a diffuse screen has thereon an integral alignment reticle physically located at the focus of wavefronts reflected by test and reference surfaces to be aligned with an optical axis of the interferometer. During alignment of commercial embodiments of this interferometer, the optics are configured so that a spot of light which represents the image of the test surface to be aligned is focused onto the diffuse screen. The surface of the diffuse screen itself is uniformly illuminated so that the reticle thereon can be viewed. The spot appearing on the diffuse screen then is imaged onto the lens of a video camera together with an image of the illuminated diffuse screen and the opaque reticle thereon. The spot produced by the test surface to be aligned, the surface of the diffuse screen and the reticle are viewed on a video monitor connected to the output of the camera. When the test surface has been adjusted so that the monitor image of the spot is aligned with the monitor image at the marked center of the reticle, the test surface is aligned. A part of the optics including the diffuse screen then is switched out of the path to the lens of the video camera, so the video camera can be used to view an interference pattern produced by beams reflected from a reference surface and the test surface.

The assignee of the present application has utilized a different alignment system in a product known as the WYKO 6000. This alignment system contains no integral reticle or any other physical indicia anywhere on the optical axis of the interferometer. Instead, an electronically-generated alignment indicia is produced at the surface of a video monitor. No integral reticle is provided on a diffuse screen, but spot images of test and reference surface are imaged onto a diffuse screen. The diffuse screen is not illuminated and therefore cannot be viewed on the video monitor. The spot images on the diffuse screen are viewed on a video camera. The color of the software-generated alignment indicia on the monitor can be different than the imaged spots as they appeared on the monitor screen, and are essentially "transparent" so that the spot images appear clearly even if located "behind" a part of the software-generated alignment indicia.

Typical alignment procedures, such as the one described in the above Domenicali patent and the Wyko 6000 interferometer, are problematic for use in infrared interferometers because infrared video cameras usually contain Vidicon tubes that are very sensitive to heat. The energy levels associated with the infrared laser typically are many watts, and a focused infrared laser beam is capable of reaching temperatures over 370 degrees Centigrade in time periods of much less than one second. If an infrared beam impinging on a Vidicon tube increases a temperature therein above 49 degrees Centigrade, irreparable damage to material of a surface of the Vidicon tube is caused, and the Vidicon tube must be replaced or repaired at a very high cost. Since an infrared laser beam generates heat almost instantaneously on a surface on which the beam impinges, alignment techniques for infrared interferometers cannot include focusing an infrared beam directly on an infrared camera. Therefore helping alignment of a test beam in an infrared interferometer is important because the infrared laser beams are invisible, unlike the situation described above in the Domenicali patent and in the Wyko 6000 system.

SUMMARY OF THE INVENTION

Accordingly, it is an object of the invention to provide a technique for rapidly aligning the test beam of an infrared interferometer to a reference beam thereof.

It is another object of the invention to provide a test beam alignment technique for an infrared camera that avoids focusing of an infrared beam directly on a Vidicon tube surface.

It is another object of the invention to provide an infrared interferometer alignment technique that avoids damage to expensive Vidicon cameras.

Briefly described, and in accordance with one embodiment thereof, the invention provides a system for aligning a test beam of an infrared interferometer with a reference beam thereof. A phosphor screen is positioned in the common path of the interferometer at a focal point of a lens. The phosphor screen is illuminated with ultraviolet light to stimulate an area of the phosphor screen to emit visible light. Infrared laser light from the test beam is focused to a spot on the phosphor screen. The infrared laser light prevents the phosphor screen from emitting visible light from the spot illuminated by the infrared laser, and hence where the infrared laser strikes the phosphor screen a dark spot appears. Visible light emitted by the phosphor screen is imaged into a visible light camera, and an image of visible light emitted by the phosphor screen is produced on a video monitor. The dark spot on the phosphor screen caused by the infrared laser beam appears as an image spot on the video monitor. The test beam is adjusted to move the image spot to a predetermined location of the video monitor representing an aligned condition in which the test beam is parallel to the reference beam. In the described embodiment, infrared light in a reference arm of the interferometer is blocked to prevent it from being focused onto the phosphor screen to minimize the heat incident on the phosphor screen. The phosphor screen is slowly rotated to prevent the spot from being overheated by the infrared laser and burning a hole in the screen. Also, the infrared light from an infrared laser can be pulsed to reduce heating of the spot and has the further benefit of making the dark spot in the light background easier to see. After alignment of the test beam, the phosphor screen is removed from the path to allow an interference beam produced by interference between the reference beam and the test beam to be imaged into an infrared camera.

BRIEF DESCRIPTION OF THE DRAWINGS

FIG. 1 is a schematic diagram of the present invention.

DETAILED DESCRIPTION OF THE PREFERRED EMBODIMENT

Referring now to FIG. 1, infrared interferometer system 1, which incorporates the present invention, includes an infrared laser 2. Laser 2 can be a 14 watt infrared laser. It produces more than enough power to damage a detector surface of an expensive infrared camera such as 35 if the output beam of laser 2 is focused onto such detector surface. Infrared laser 2 optionally is powered by a pulsed power supply 3, which in turn is controlled by a 2–3 hertz square wave generator 4.

Infrared laser 2 is positioned so that its output beam 5 is expanded by lens 6 to produce diverging beam 8. Beam 8 is collimated by lens 10 to produce a collimated beam 12 that impinges on beamsplitter 13. Part of beam 12 is reflected as reference beam 14 onto a reference surface 11 and returned to the upper surface of beamsplitter 13. The other part of beam 12 is transmitted by beamsplitter 13 as test beam 27. The reference beam passes back through beamsplitter 13 to lens 20. Lens 20 focuses the beam so it is reflected from the upper surface of beamsplitter 40, from which it passes through focus and beam 33 to lens 34, collimated, and directed into a Vidicon tube detector of infrared camera 35. Beamsplitter 40 reflects infrared light and passes visible light. Part of beam 12 passes through the beamsplitter 13 to become test beam 27.

Test beam 27 is reflected from test surface 18 back to the bottom surface of beamsplitter 13 from which it is reflected, and then is focused by lens 20 and reflected by beamsplitter 40 into the objective of infrared camera 35, so that an interference pattern between the test beam and the reference beam is received by infrared camera 35 during normal interferometric operation.

In accordance with the present invention, a phosphor screen 40 is "flipped" into the path between beamsplitter 40 and lens 34 to carry out an initial alignment procedure. Preferably, blocking element 9 is moved as indicated by 9a into the path of reference beam 14 to block it during the alignment procedure of the present invention. Phosphor screen 23 is rotatable about an axis 41 and can be removed from the path of the infrared video camera 35 in the direction of 23a. An ultraviolet lamp 21 illuminates at least the portion of the surface of phosphor screen 23 viewable by a visible light camera 25 positioned to the left of beamsplitter 40. Numerals 27 show the test beam reflected by test surface 18 if test surface 18 is perfectly aligned with reference beam 14. That test beam is reflected downward by beamsplitter 13, as indicated by numerals 19, and is focused by lens 20 onto beamsplitter 40, as indicated by numerals 22. A portion of this beam then is reflected by beamsplitter 40, as indicated by numerals 30, onto a spot 31 of slowly rotating phosphor screen 23.

The resulting heating of the phosphor material at spot 31 prevents visible light from being emitted from spot 31 by phosphor screen 23 in response to illumination by ultraviolet lamp 21. The resulting "dark spot" 31 appears as a corresponding dark spot 31A on the screen of video monitor 26 as a result of dark spot 31 being viewed by visible light camera 25 through the back side of beamsplitter 40.

The infrared interferometer system 1 thus images the focused laser beam coming from the test arm of the interferometer onto rotating phosphor screen 23, which is viewed by visible light camera 25. Alignment of test beam 27 with reference beam 14 then is accomplished by finding the focused spot resulting from test surface 18 and tilting test surface 18 to move the spot 31 to the center indicia 36 of monitor 26. Fringes can be obtained even though the beam is not perfectly aligned with cursor 36 but is slightly outside of it. The initial alignment of test beam 27 assumes that the reference beam 14 is initially accurately aligned.

The infrared radiation incident upon phosphor screen 23 can damage the phosphor material thereof due to burning the material by heat generated by absorption of the infrared beam. To minimize this potential problem, the phosphor material can be rotated one or two revolutions per minute to keep the heat buildup small. Also, a limit on laser power can be established for the alignment mode by pulsing the laser output. However, in some cases, the resulting reduced power may not be enough to permit the user to find the spot 31A on its screen of monitor 26 if a low reflectivity test surface 18 is being aligned. If necessary, a momentary increase in the available laser power can be provided by means of an appropriate circuit in power supply 3.

It should be understood that the heat generated by infrared laser 2, when its output beam focused onto the phosphor screen 23, heats phosphor at the focus spot up to a point at which the phosphor material does not fluoresce in response to illumination by ultraviolet lamp 21. Consequently, dark spots 31 and 31A appear on phosphor screen 23 as a result of its failure to emit visible light at spot 31 in response to illumination by ultraviolet lamp 21.

Shifted spot 31A is produced on phosphor screen 23 when test surface 18 is tilted so as to produce the misaligned test beam designated by reference numerals 37. Numerals 38 designate visible light defining the dark spot 31A on phosphor screen 23. Numeral 36 designates an alignment indicia (such as a circle or cross) on a screen of video monitor 26, with dark spot 31 being perfectly aligned thereto. Dark spot 31A indicates misalignment of the test beam 27 due to the tilted condition of mirror 18.

To correct such misalignment, the user of system 1 simply adjusts test surface 18 until spot 31A moves to alignment with indicia 36 on monitor 26 in order to quickly align test beam 27 of infrared interferometer 1. Phosphor screen 23 then is flipped out of the way, and beam blocking element 9 is moved out of the reference beam path in the reference arm of the interferometer.

The above described alignment system is inexpensive, and provides fast, convenient alignment of the test beam 27 to the reference beam 14 without allowing the infrared laser beam to cause any damage to the Vidicon element of infrared camera 35.

The components of FIG. 1 exclusive of alignment system elements 9, 21, 23, 29, 25, and 26 are conventional, and can, for example, be the ones utilized in the assignee's IR3 interferometer.

The phosphor screen can be implemented by means of #8 thermal phosphor material, available from Optical Engineering, Inc.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention.

What is claimed is:

1. A method of aligning a test beam of an infrared interferometer with a reference beam thereof, the method comprising the steps of:
   (a) positioning a phosphor screen in a common path of the interferometer at a focal point of a lens in the common path;

(b) illuminating the phosphor screen with ultraviolet light to stimulate an area of the phosphor screen to emit visible light;

(c) focusing infrared laser light of the test beam to a spot on the phosphor screen, the infrared laser light acting on the phosphor screen at the spot to reduce an amount of visible light emitted from the spot by the phosphor screen;

(d) focusing visible light emitted by the phosphor screen into a visible light camera, and producing an image of visible light emitted by the phosphor screen on a video monitor coupled to the visible light camera, the spot on the phosphor screen appearing as an image spot on the video monitor; and (e) adjusting the test beam to move the image spot to a predetermined location of the video monitor representing an aligned condition.

2. The method of claim 1 including blocking infrared light in a reference arm of the interferometer to prevent it from being focused onto the phosphor screen and overheating the phosphor screen.

3. The method of claim 1 including removing the phosphor screen out of the interference path to allow an interference beam produced by interference between the reference beam and the test beam to be imaged into an infrared camera.

4. The method of claim 1 including slowly translating the phosphor screen at a speed sufficient to prevent the spot from being overheated by the infrared light focused from the test beam.

5. The method of claim 1 including pulsing infrared light from an infrared laser into test arm of the interferometer during alignment of the test beam to reduce heating of the spot.

6. An apparatus for aligning a test beam of an infrared interferometer, the interferometer including a test arm, a reference arm, an infrared camera, and a test surface in the test arm, the apparatus comprising in combination:

(a) a phosphor screen positioned in an interference path of the interferometer at a focal point of a lens in the path during aligning of the test beam;

(b) an ultraviolet light source positioned to illuminate an area of the phosphor screen, causing the phosphor screen to emit visible light;

(c) means for focusing infrared light from the test beam along the interference path to a spot on the phosphor screen, the infrared laser light acting on the phosphor screen at the spot to reduce an amount of visible light emitted from the spot;

(d) a visible light video camera and a video monitor coupled to receive image information from the visible light video camera;

(e) means for focusing visible light emitted by the phosphor screen into the visible light camera to produce an image of visible light emitted by the phosphor screen on the video monitor, the spot appearing as an image spot on the video monitor;

(f) an alignment indicia associated with a viewing screen of the video monitor, whereby the test beam can be adjusted so as to move the image spot into alignment with the alignment indicia to thereby align the test beam with the reference beam.

7. The apparatus of claim 6 including a blocking element movable to block passage of infrared light through the reference arm of the infrared interferometer during alignment of the test beam to prevent overheating of the phosphor screen.

8. The apparatus of claim 6 including means for moving the phosphor screen into the interference path during alignment of the test beam to allow infrared light of the test beam to be focused onto a spot on the phosphor screen, and means for moving the phosphor screen out of the interference path to allow interferometry.

9. The apparatus of claim 6 including means for slowly rotating the phosphor screen at a speed sufficient to prevent the spot from being overheated by infrared light from the test beam onto the phosphor screen.

10. The apparatus of claim 1 including means for causing pulsing of infrared light produced by the infrared laser during alignment of the test beam to reduce heating of the spot.

* * * * *